United States Patent
Alam et al.

(10) Patent No.: US 7,665,897 B2
(45) Date of Patent: Feb. 23, 2010

(54) SQUEEZE FILM DAMPER USING LOW PRESSURE OIL

(75) Inventors: Mohsiul Alam, Chandler, AZ (US); Doug K. Spencer, Mesa, AZ (US)

(73) Assignee: Honeywell International Inc., Morristown, NJ (US)

( * ) Notice: Subject to any disclaimer, the term of this patent is extended or adjusted under 35 U.S.C. 154(b) by 824 days.

(21) Appl. No.: 11/333,711

(22) Filed: Jan. 17, 2006

(65) Prior Publication Data

US 2007/0165971 A1 Jul. 19, 2007

(51) Int. Cl.
*F16C 33/66* (2006.01)
(52) U.S. Cl. .......................................... 384/99; 384/474
(58) Field of Classification Search ................. 384/99, 384/535, 581, 474, 475
See application file for complete search history.

(56) References Cited

U.S. PATENT DOCUMENTS

| | | | |
|---|---|---|---|
| 3,351,394 A | 11/1967 | Hooker | |
| 3,756,672 A * | 9/1973 | Hibner et al. | 384/99 |
| 4,693,616 A | 9/1987 | Rohra et al. | |
| 4,775,248 A | 10/1988 | Barbic et al. | |
| 4,884,903 A | 12/1989 | Pham et al. | |
| 5,067,825 A | 11/1991 | Vance et al. | |
| 5,071,262 A | 12/1991 | Monzel et al. | |
| 5,149,206 A | 9/1992 | Bobo | |
| 5,169,241 A | 12/1992 | Singh | |
| 5,207,511 A | 5/1993 | Bobo | |
| 5,215,384 A | 6/1993 | Maier | |
| 5,228,784 A | 7/1993 | Bobo | |
| 5,749,660 A | 5/1998 | Dusserre-Telmon et al. | |
| 6,431,756 B2 | 8/2002 | Maquire et al. | |
| 2001/0009592 A1 | 7/2001 | Maquire et al. | |
| 2003/0190099 A1 | 10/2003 | Alam et al. | |
| 2004/0022463 A1 | 2/2004 | Dusserre-Telmon et al. | |
| 2004/0062460 A1 | 4/2004 | Dusserre-Telmon et al. | |
| 2005/0133466 A1 | 6/2005 | Bridges | |
| 2005/0235651 A1 | 10/2005 | Morris et al. | |

FOREIGN PATENT DOCUMENTS

GB 1104478 A 2/1968

OTHER PUBLICATIONS

EP Search Report, 07100590.4-2315/1808580 dated Jul. 10, 2008.

* cited by examiner

Primary Examiner—Thomas R Hannon
(74) Attorney, Agent, or Firm—Ingrassia Fisher & Lorenz, P.C.

(57) ABSTRACT

A squeeze film damper is provided that includes a fluid source, a shaft, a bearing assembly, a static bearing support, and a dam. The shaft includes openings formed therein and an annular channel in communication therewith that is configured to receive fluid from the fluid source. The bearing assembly is disposed concentric to the shaft and includes an inner race coupled to the shaft, an outer race disposed concentric to the inner race, and a rolling element disposed between the inner and outer races. Each of the inner and outer races includes openings configured to receive fluid from the shaft opening. The static bearing support housing is spaced apart from the outer race to define a clearance therebetween. The dam is disposed adjacent the bearing assembly and extends radially inwardly relative to the bearing support housing defining a shelf for receiving the fluid from the race openings and directing the fluid into the clearance.

18 Claims, 3 Drawing Sheets

SQUEEZE FILM DAMPER USING LOW PRESSURE OIL

TECHNICAL FIELD

The present invention relates to turbine engines for aircraft and, more particularly, to a damper for use in a hot section of the engine, such as, for example, in a turbine section.

BACKGROUND

A gas turbine engine may be used to power various types of vehicles and systems. A particular type of gas turbine engine that may be used to power aircraft is a turbofan gas turbine engine. A turbofan gas turbine engine may include, for example, five major sections, a fan section, a compressor section, a combustor section, a turbine section, and an exhaust section. Each section includes components that are coupled to a rotor and disposed within an engine housing. The fan section is positioned at the front, or "inlet" section of the engine, and includes a fan that induces air from the surrounding environment into the engine, and accelerates a fraction of this air toward the compressor section. The remaining fraction of air induced into the fan section is accelerated into and through a bypass plenum, and out the exhaust section.

The compressor section raises the pressure of the air it receives from the fan section to a relatively high level. In a multi-spool engine, the compressor section may include two or more compressors, such as, for example, a high pressure compressor and a low pressure compressor. The compressed air from the compressor section then enters the combustor section, where a ring of fuel nozzles injects a steady stream of fuel into a plenum formed by liner walls and a dome. The injected fuel is ignited in the combustor, which significantly increases the energy of the compressed air. The high-energy compressed air from the combustor section then flows into and through the turbine section, causing rotationally mounted turbine blades to rotate and generate energy. The air exiting the turbine section is exhausted from the engine via the exhaust section, and the energy remaining in the exhaust air aids the thrust generated by the air flowing through the bypass plenum.

During engine operation, vibration may occur when the rotor and components mounted thereto rotates. Typically, the vibration is caused by a rotating mass imbalance, or may occur when a radial deflection of the rotor results in tangential force normal to the deflection. The magnitude of the tangential force increases with the deflection. A damping system is typically needed in the engine to reduce vibration, there by, minimizing fatigue stress on the engine and its supports, and to safeguard against potential damage that can be caused by vibration.

In some cases, a squeeze film damper is included in the engine. Typically, the squeeze film damper operates by supplying fluid (usually oil) through dedicated oil delivery passages into a cavity between the engine housing and a bearing support mounted around the rotor. Although this configuration is useful for bearing locations in the aft sections of the engine, it may be as useful in the forward sections of the engine, more particularly, those locations that are exposed to temperatures in excess of 700° F. Specifically, because the aft sections of the engine, such as the combustor section and the turbine section, reaches such high temperatures, the fluid therein may solidify or cause coking of other components. Consequently, debris build-up in the oil delivery passages may occur restricting oil flow and causing damage thereto.

Thus, there is a need for an engine damping system that remains operational when exposed to temperatures in excess of 500° F. Moreover, it is desirable for the system not to create debris build-up that may damage the engine. Additionally, it is desirable for the system to be relatively simple and inexpensive to implement.

BRIEF SUMMARY

The present invention provides a squeeze film damper for use in an engine.

In one embodiment, and by way of example only, the damper includes a fluid source, a shaft, a bearing assembly, a static bearing support, and a dam. The shaft extends axially through the engine and has an annular channel extending at least partially therethrough. The shaft further includes an inner surface, an outer surface, and an opening formed therebetween. The annular channel is configured to receive fluid from the fluid source, and the opening communicates with the annular channel and is configured to receive the fluid therefrom. The bearing assembly is disposed concentric to the shaft and includes an inner race coupled to the shaft, an outer race disposed concentric to the inner race, and a rolling element disposed between the inner and outer races. Each of the inner and outer races include openings therethrough configured to receive fluid from the shaft opening. The static bearing support housing is at least partially coupled to and surrounds the outer race. The housing includes an inner surface spaced apart from the outer race to define a clearance therebetween. The dam is disposed adjacent the bearing assembly and extends radially inwardly relative to the bearing support housing defining a shelf for receiving the fluid from the race openings and directing the fluid into the clearance.

In another embodiment, and by way of example only, the squeeze film damper includes a fluid source, a shaft, an annular oil catcher, a bearing assembly, a static bearing support housing, and first and second dams. The shaft extends axially through the engine and has an annular channel extending at least partially therethrough. The shaft further includes an inner surface, an outer surface, and an opening formed therebetween. The annular channel is configured to receive fluid from the fluid source, and the opening is in communication with the annular channel and configured to receive the fluid therefrom. The annular oil catcher has a mount section and a catch section. The mount section is coupled to the shaft and includes an axial groove formed therein. The catch section extends axially from the mount section and is configured to form a space with the shaft outer surface that receives fluid from the shaft opening. The bearing assembly is disposed concentric to the shaft and includes an inner race coupled to the shaft, an outer race disposed concentric to the inner race, and a rolling element disposed between the inner and outer races. Each of the inner and outer races includes openings therethrough configured to receive fluid from the shaft opening. The static bearing support housing is at least partially coupled to and surrounds the outer race. The housing includes an inner surface spaced apart from the outer race to define a clearance therebetween. The first dam is disposed forward the bearing assembly and extends radially inwardly relative to the bearing support housing. The first dam defines a shelf for receiving the fluid from the race openings and directs the fluid into the clearance. The second dam extends radially inwardly relative to the bearing support housing and is located aft relative to the bearing. The second dam is configured to maintain at least a portion of the fluid between the first and the second dams.

In still another embodiment, an engine is provided. The engine includes an engine case, a compressor section disposed within the engine case, a combustor section coupled to the compressor section, a turbine section coupled to the combustor section, and a squeeze film damper disposed in the turbine section. The squeeze film damper fluid source, a shaft, a bearing assembly, a static bearing support, and a dam. The shaft extends axially through the engine and has an annular channel extending at least partially therethrough. The shaft further includes an inner surface, an outer surface, and an opening formed therebetween. The annular channel is configured to receive fluid from the fluid source, and the opening communicates with the annular channel and is configured to receive the fluid therefrom. The bearing assembly is disposed concentric to the shaft and includes an inner race coupled to the shaft, an outer race disposed concentric to the inner race, and a rolling element disposed between the inner and outer races. Each of the inner and outer races includes openings therethrough configured to receive fluid from the shaft opening. The static bearing support housing is at least partially coupled to and surrounds the outer race. The housing includes an inner surface spaced apart from the outer race to define a clearance therebetween. The dam is disposed adjacent the bearing assembly and extends radially inwardly relative to the bearing support housing defining a shelf for receiving the fluid from the race openings and directing the fluid into the clearance.

Other independent features and advantages of the preferred squeeze film damper will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that the described embodiment is not limited to use in conjunction with a particular type of turbine engine. Thus, although the present embodiment is, for convenience of explanation, depicted and described as being implemented in a multi-spool turbofan gas turbine jet engine, it will be appreciated that it can be implemented in various other types of turbines, and in various other systems and environments. Moreover, although the invention is described as being implemented into a turbine section of the engine, it will be appreciated that the invention may alternatively be used in any other section of the engine that may need damping.

Figure 1:
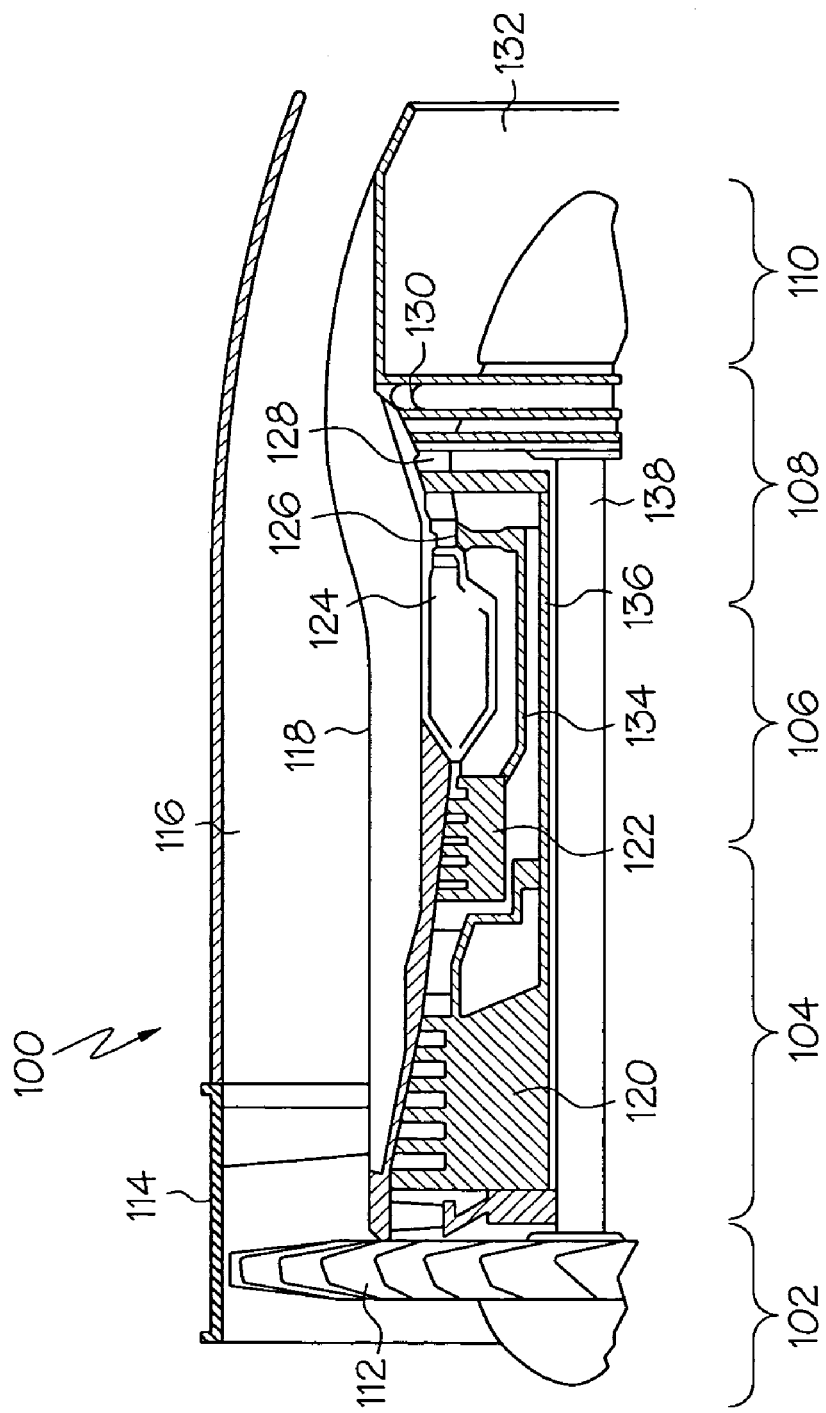
FIG. 1 is a simplified cross section side view of an exemplary multi-spool turbofan gas turbine jet engine.

An exemplary embodiment of a multi-spool turbofan gas turbine jet engine 100 is depicted in FIG. 1, and includes an intake section 102, a compressor section 104, a combustion section 106, a turbine section 108, and an exhaust section 110. The intake section 102 includes a fan 112, which is mounted in a fan case 114. The fan 112 draws air into the intake section 102 and accelerates it. A fraction of the accelerated air exhausted from the fan 112 is directed through a bypass section 116 disposed between the fan case 114 and an engine cowl 118, and provides a forward thrust. The remaining fraction of air exhausted from the fan 112 is directed into the compressor section 104.

The compressor section 104 includes two compressors, an intermediate pressure compressor 120, and a high pressure compressor 122. The intermediate pressure compressor 120 raises the pressure of the air directed into it from the fan 112, and directs the compressed air into the high pressure compressor 122. The high pressure compressor 122 compresses the air still further, and directs the high pressure air into the combustion section 106. In the combustion section 106, which includes an annular combustor 124, the high pressure air is mixed with fuel and combusted. The combusted air is then directed into the turbine section 108.

The turbine section 108 includes three turbines disposed in axial flow series, a high pressure turbine 126, an intermediate pressure turbine 128, and a low pressure turbine 130. The combusted air from the combustion section 106 expands through each turbine, causing it to rotate. The air is then exhausted through a propulsion nozzle 132 disposed in the exhaust section 110, providing addition forward thrust. As the turbines rotate, each drives equipment in the engine 100 via concentrically disposed shafts or spools. Specifically, the high pressure turbine 126 drives the high pressure compressor 122 via a high pressure shaft 134, the intermediate pressure turbine 128 drives the intermediate pressure compressor 120 via an intermediate pressure shaft 136, and the low pressure turbine 130 drives the fan 112 via a low pressure shaft 138.

Figure 2:
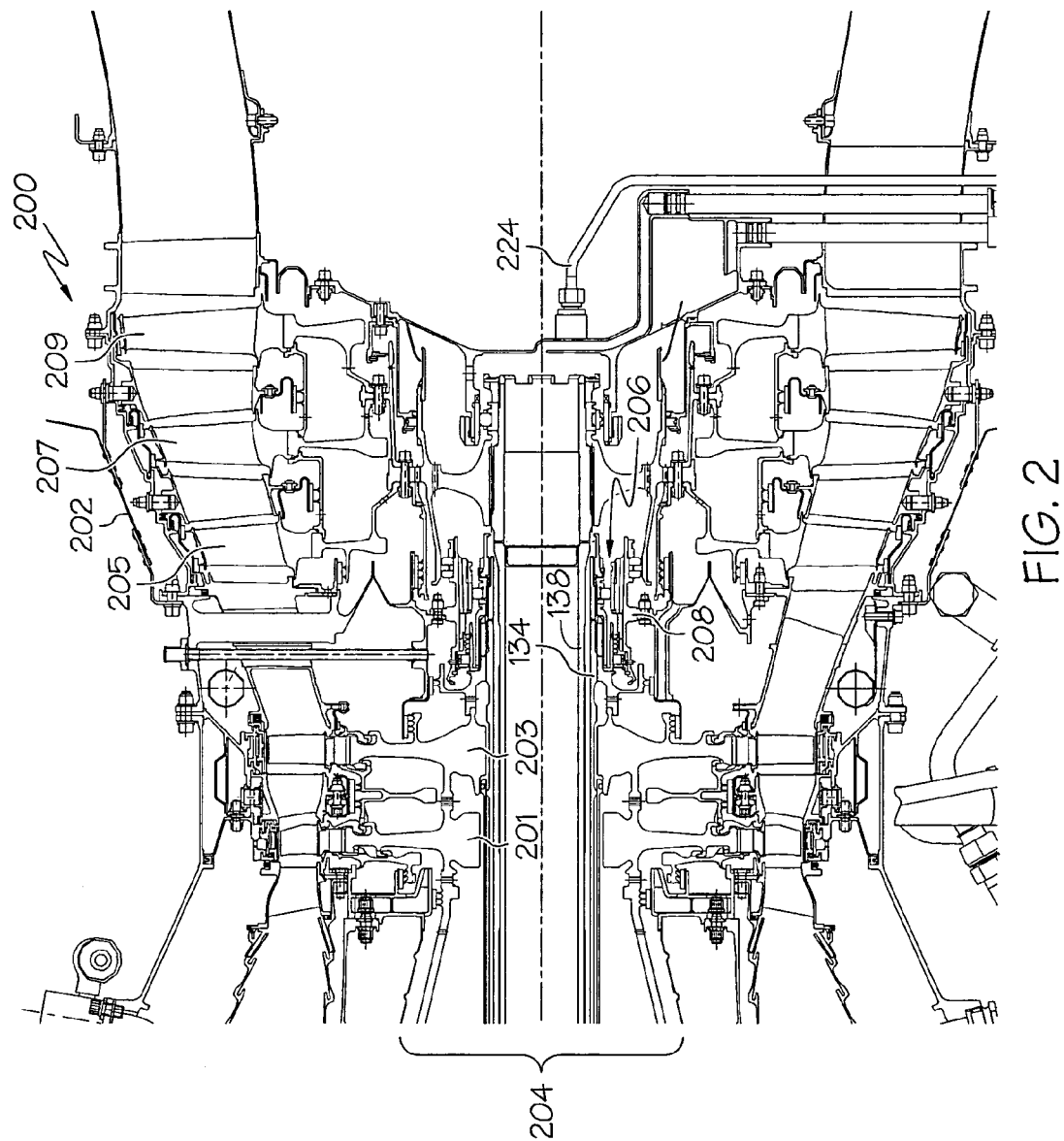
FIG. 2 is a cross section view of a portion of an exemplary turbine section that may be used in the engine of FIG. 1.

Turning to FIG. 2, a cross section is provided of an exemplary turbine section 200 that may be implemented into the engine shown in FIG. 1. The turbine section 200 is disposed in an engine case 202 and includes, high pressure turbines 201, 203, low pressure turbines 205, 207, 209, a bearing assembly 206, and a static bearing support housing 208 that is coupled to the engine case 202. The rotor 204 comprises at least the high and low pressure shafts 134, 138 and includes the corresponding turbines 201, 203 and 205, 207, 209 mounted, respectively, thereto. The bearing assembly 206 is also mounted to one of the shafts, for example, the high pressure shaft 134, to maintain the high pressure portion of the rotor 204 in a proper position during rotation.

Figure 3:
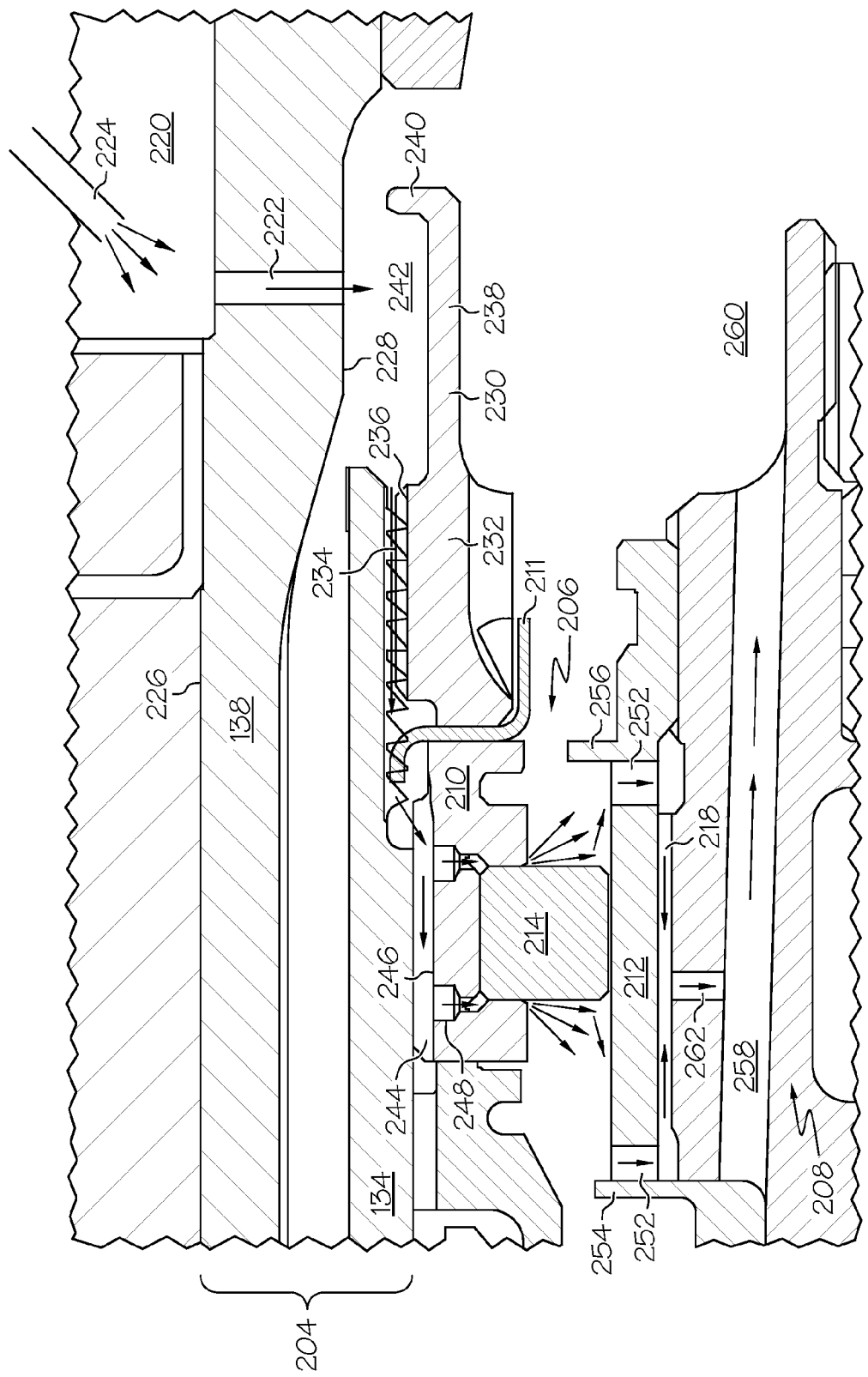
FIG. 3 is a close-up view of an exemplary squeeze film damping system that may be implemented into the turbine section shown in FIG. 2.

A close up view of the bearing assembly 206 is provided in FIG. 3. The bearing assembly 206 includes an inner race 210, an outer race 212, and a conventional rolling element 214, such as a bearing, disposed therebetween. The inner race 210 is mounted to a shaft, such as, for example, to the high pressure shaft 134, and the outer race 212 is mounted to a portion of the static bearing support housing 208. Preferably, the static bearing support housing 208 is sufficiently spaced apart from the outer race 212 configured such that an annular clearance 218 is defined therebetween.

The bearing assembly 206 is preferably kept lubricated via a lubrication system that directs fluid thereto through a series of openings. In one exemplary embodiment, as shown in FIG. 3, a radial opening 222 is formed in the low pressure shaft 138 that communicates with an annular channel 220 disposed proximate the shaft 138. The annular channel 220 receives lubricating oil from a supply line 224. The opening 222 is formed between an inner and an outer surface 226, 228 of a portion of the low pressure shaft 138, and communicates with and receives fluid from the annular channel 220. Although the opening 222 is shown as being formed in the low pressure shaft 138, it will be appreciated that, in other embodiments, the opening 222 may be formed alternatively in the high pressure shaft 134. In still other embodiments, the rotor 204 may be a single, double or triple rotor and in such case, the opening 222 is formed in any suitable portion of any one of the rotors. Moreover, although one only opening 222 is shown, more may alternatively be incorporated in other embodiments.

An annular oil catcher 230 is preferably mounted to the high pressure shaft 134 to receive fluid that is discharged from the rotor opening 222, and directs the received fluid to appropriate sections of the bearing assembly 206. The annular oil catcher 230 may have any one of numerous suitable configurations. In one exemplary embodiment, the annular oil catcher 230 is a nut that, along with a washer 211, abuts the inner race 210 and maintains the inner race 210 on the high pressure shaft 134. The nut includes a mount section 232 and a catch section 238. The mount section 232 couples to the high pressure shaft 134 and includes a threaded inner surface 234 having an axial groove 236 formed therein. The catch section 238 axially extends from the mount section 232 and is configured to receive the fluid discharged from the rotor openings 222. In this regard, the catch section 238 may include a radially inwardly extending lip 240 that, together with the catch section 238 and the rotor outer surface 228, defines a catch space 242 into which the fluid is fed.

The fluid received in the catch section 238 travels through the axial groove 236 of the oil catcher mount section 232 toward the bearing assembly 206. Preferably, the fluid is directed through an axial slot 244 formed on a surface 246 of the inner race 210 and into one or more radial openings 248. The radial openings 248 are also formed through the inner race 210 and are disposed such that the fluid may be directed to various portions of the bearing 214.

To dampen vibration that may result from rotor rotation, a squeeze film damping system is incorporated into the turbine section 200. The squeeze film damping system is configured to direct the fluid used to lubricate the bearing assembly 206 into the clearance 218 between the outer race 212 and static bearing support housing 208, providing a vibration dampening cushion. In this regard, the squeeze film damping system includes not only the lubrication system described above, but also additional radial race openings 252, fluid dams 254, 256 and an oil scavenge slot 258.

The additional radial race openings 252 are preferably formed through the outer race 212 and are configured to receive fluid that lubricates the bearings elements 214. The received fluid is collected between the two fluid dams 254, 256 which extend radially inwardly from either the static bearing housing 208, or any other suitable component. It will be appreciated that the dams 254, 256 may be coupled to or formed as part of another component such as the static bearing housing 208. In one exemplary embodiment, the forward dam 254 extends radially inwardly from a portion of the static bearing housing 208, and the aft dam 254 extends from a suitable part of a nut that may be used to clamp the outer race 212.

The oil scavenge slot 258 is configured to drain the fluid from the clearance 218 to a drain cavity 260. In particular, the oil scavenge slot 258 is preferably formed in and extends axially along at least a portion of the bearing support housing 208. A damper drain opening 262 is provided in the support housing 208 that provides communication between the oil scavenge slot 258 and the clearance 218.

During rotor rotation, some of the fluid that lubricates the bearings 214 collects between the forward and aft fluid dams 254, 256. The rotor rotation creates negative pressure in the clearance 218, at the radially opposite side of the high pressure point,. This negative pressure helps to draw the fluid in through the outer race openings 252 into the clearance 218. As a result, a vibration dampening oil film is provided between the outer race 212 and static bearing support housing 208.

There has now been provided a squeeze film damping system that may be simply and relatively inexpensively incorporated into an engine that uses fluid which already exists in the engine to lubricate the bearing. The system is not only useful for providing damping in a turbine section of an engine, as described above, but may also be implemented in other hot as well as cold sections, such as the combustor, or the compressor or fan section of an engine. Specifically, the system may be incorporated into any portion of the engine that includes a fluid source, a bearing assembly, and a static structure proximate the bearing assembly.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A squeeze film damper for use in an engine, comprising:
    a fluid source;
    a shaft extending axially through the engine and having an annular channel extending at least partially therethrough, and further including an inner surface, an outer surface, and an opening formed therebetween, the annular channel configured to receive fluid from a fluid source, the opening in communication with the annular channel and configured to receive the fluid therefrom;
    a bearing assembly disposed concentric to the shaft and including an inner race coupled to the shaft, an outer race disposed concentric to the inner race, and a rolling element disposed between the inner and outer races, each of the inner and outer races including openings therethrough configured to receive fluid from the shaft opening;
    a static bearing support housing at least partially coupled to and surrounding the outer race, the housing including an inner surface spaced apart from the outer race to define a clearance therebetween;
    a first dam disposed adjacent the bearing assembly, the first dam extending radially inwardly relative to the bearing support housing and defining a shelf for receiving the fluid from the race openings and directing the fluid into the clearance; and
    a second dam extending radially inwardly relative to the bearing support housing located aft relative to the bearing and extending from the outer race, the second dam configured to maintain at least a portion of the fluid between the dams.

2. The system of claim 1, further comprising a plurality of openings formed between the inner and outer surfaces of the shaft.

3. The system of claim 1, further comprising an annular oil catcher having a mount section and a catch section, the mount section coupled to the shaft and including an axial groove formed therein, the catch section extending axially from the mount section and configured to form a space with the shaft outer surface that receives fluid from the shaft opening.

4. The system of claim 3, wherein the annular oil catcher comprises a radially inwardly extending lip forming a catch space therebetween for catching the fluid.

5. The system of claim 3, further comprising a washer disposed between the annular oil catcher and the inner race, wherein the inner race is mounted to the shaft.

6. The system of claim 1, wherein the first dam extends from the bearing support housing.

7. The system of claim 1, wherein the bearing housing includes a radially extending damper drain opening formed therein, the damper drain opening in fluid communication with the clearance.

8. The system of claim 7, wherein the bearing housing further includes an axially extending oil scavenge slot in fluid communication with the damper drain opening.

9. A squeeze film damper for use in an engine, comprising:
 a fluid source;
 a shaft extending axially through the engine and having an annular channel extending at least partially therethrough, and further including an inner surface, an outer surface, and an opening formed therebetween, the annular channel configured to receive fluid from the source, the opening in communication with the annular channel and configured to receive the fluid therefrom;
 an annular oil catcher having a mount section and a catch section, the mount section coupled to the shaft and including an axial groove formed therein, the catch section extending axially from the mount section and configured to form a space with the shaft outer surface that receives fluid from the shaft opening;
 a bearing assembly disposed concentric to the shaft and including an inner race coupled to the shaft, an outer race disposed concentric to the inner race, and a rolling element disposed between the inner and outer races, each of the inner and outer races including openings therethrough configured to receive fluid from the shaft opening;
 a static bearing support housing at least partially coupled to and surrounding the outer race, the housing including an inner surface spaced apart from the outer race to define a clearance therebetween;
 a first dam disposed forward the bearing assembly, the dam extending radially inwardly relative to the bearing support housing and defining a shelf for receiving the fluid from the race openings and directing the fluid into the clearance; and
 a second dam extending radially inwardly relative to the bearing support housing located aft relative to the bearing and configured to maintain at least a portion of the fluid between the first and the second dams.

10. An engine, comprising:
 an engine case;
 a compressor section disposed within the engine case;
 a combustor section coupled to the compressor section;
 a turbine section coupled to the combustor section; and
 a squeeze film damper disposed in the turbine section comprising:
  a fluid source;
  a shaft extending axially through the engine and having an annular channel extending at least partially therethrough, and further including an inner surface, an outer surface, and an opening formed therebetween, the annular channel configured to receive fluid from the source, the opening in communication with the annular channel and configured to receive the fluid therefrom;
  a bearing assembly disposed concentric to the shaft and including an inner race coupled to the shaft, an outer race disposed concentric to the inner race, and a rolling element disposed between the inner and outer races, each of the inner and outer races including openings therethrough configured to receive fluid from the shaft opening;
  a static bearing support housing at least partially coupled to and surrounding the outer race, the housing including an inner surface spaced apart from the outer race to define a clearance therebetween; and
  a dam disposed adjacent the bearing assembly, the dam extending radially inwardly relative to the bearing support housing and defining a shelf for receiving the fluid from the race openings and directing the fluid into the clearance.

11. The system of claim 10, further comprising an annular oil catcher having a mount section and a catch section, the mount section coupled to the shaft and including an axial groove formed therein, the catch section extending axially from the mount section and configured to form a space with the shaft outer surface that receives fluid from the shaft opening.

12. The system of claim 11, wherein the annular oil catcher comprises a radially inwardly extending lip forming a catch space therebetween for catching the fluid.

13. The system of claim 11, further comprising a washer disposed between the annular oil catcher and the inner race, wherein the inner race is mounted to the shaft.

14. The system of claim 10, wherein the first dam extends from the bearing support housing.

15. The system of claim 10, further comprising:
 a second dam extending radially inwardly relative to the bearing support housing located aft relative to the bearing and configured to maintain at least a portion of the fluid between the dams.

16. The system of claim 15, wherein the second dam extends from the outer race.

17. The system of claim 10, wherein the bearing housing includes a radially extending damper drain opening formed therein, the damper drain opening in fluid communication with the clearance.

18. The system of claim 17, wherein the bearing housing further includes an axially extending oil scavenge slot in fluid communication with the damper drain opening.

* * * * *

UNITED STATES PATENT AND TRADEMARK OFFICE
CERTIFICATE OF CORRECTION

PATENT NO. : 7,665,897 B2  Page 1 of 1
APPLICATION NO. : 11/333711
DATED : February 23, 2010
INVENTOR(S) : Alam et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1074 days.

Signed and Sealed this

Seventh Day of December, 2010

David J. Kappos
*Director of the United States Patent and Trademark Office*